United States Patent

Watanabe et al.

[11] Patent Number: 5,126,857
[45] Date of Patent: Jun. 30, 1992

[54] DEVICE FOR CODING A PICTURE SIGNAL BY COMPRESSION

[75] Inventors: Mikio Watanabe; Kenji Ito; Kenji Moronaga, all of Tokyo, Japan

[73] Assignee: Fuji Photo Film Co., Ltd., Kanagawa, Japan

[21] Appl. No.: 529,635

[22] Filed: May 29, 1990

[30] Foreign Application Priority Data

May 30, 1989 [JP] Japan ............... 1-134774

[51] Int. Cl.⁵ .................................. H04N 1/00
[52] U.S. Cl. ...................... 358/433; 358/432; 358/261.3
[58] Field of Search ............ 358/261.3, 427, 432, 358/433, 261.1, 261.2, 261.4, 262.1, 262, 133, 13

[56] References Cited

U.S. PATENT DOCUMENTS 4,698,689 10/1987 Tzou .................... 358/433
4,924,309 5/1990 Hartnack et al. ........... 358/133
4,984,076 1/1991 Watanabe et al. ........... 358/133

Primary Examiner—Edward L. Coles, Sr.
Assistant Examiner—Jerome Grant, II

[57] ABSTRACT

A device for coding color picture data by compression maintains compressed data in a predetermined length and prevents the amount of DC signal component data to be allocated from becoming short. A luminance signal and chrominance signals Cr and Cb are compressed independently of each other and recorded as discrete DC components and AC components. When the amount of data of DC components of the chrominance signal Cr or Cb is greater than the total amount of data assigned to the signal Cr or Cb, the amount of data assigned to the signal Cr or Cb is increased to equal the amount of data of DC components of the signal Cr or Cb while the shortage is subtracted from the allocation of AC component data of the luminance signal Y. This insures the allocation of a sufficient amount of data to the coded data of DC components at all times.

8 Claims, 7 Drawing Sheets

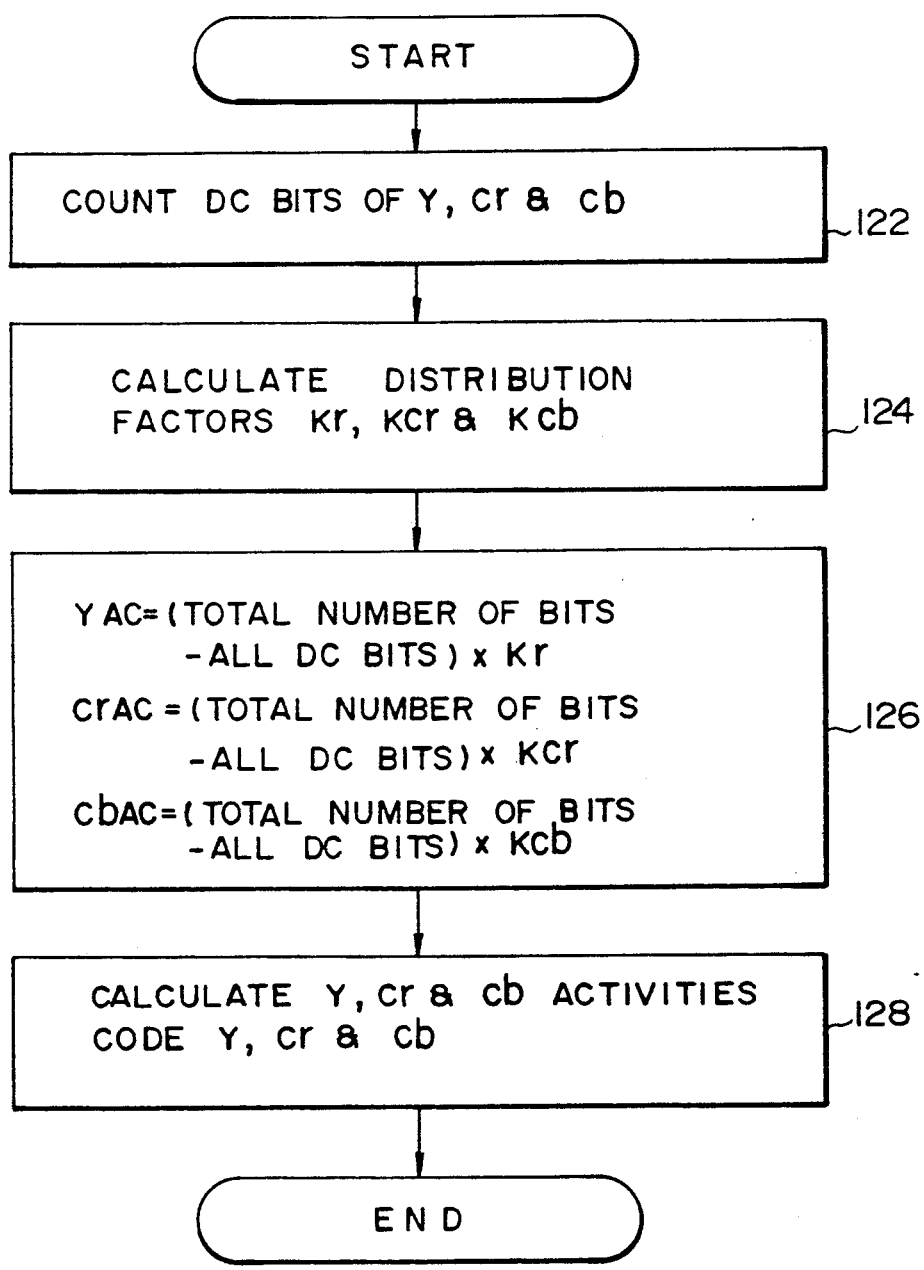

DEVICE FOR CODING A PICTURE SIGNAL BY COMPRESSION

BACKGROUND OF THE INVENTION

1. Field of the Invention

The present invention relates to a device for coding a picture signal by compression and, more particularly, to a picture signal compression coding device which maintains the amount of compressed data representative of a picture constant at all times.

2. Description of the Prior Art

Digital picture data representative of a picture picked up by an electronic still camera, for example, are stored in a memory. Various kinds of compression coding schemes have been proposed to reduce the amount of such digital picture data and thereby the required memory capacity. Among them, a two-dimensional orthogonal transform coding scheme is extensively used because it codes data by a large compression ratio and because it allows a minimum of picture distortions particular to coding to occur.

Two-dimensional orthogonal transform coding is such that picture data representative of a single picture are divided into a plurality of blocks, and the picture data are subjected to two-dimensional orthogonal transform block by block. The picture data having undergone orthogonal transform, i.e., transform coefficients are compared with a predetermined threshold so as to discard those transform coefficients which are lower than the threshold. The remaining data are normalized and then written to a memory card or similar recording medium. The coded data outputted by the above procedure differs in amount from one picture data to another and, therefore, they cannot be written to a memory without resorting to troublesome processing.

In light of the above, there has been proposed a system which calculates the degree to which high frequency components are predominant, i.e., an activity picture by picture and selects a normalizing coefficient in matching relation to the calculated activity. By so selecting a normalizing coefficient, it is possible to maintain the amount of data constant throughout all the pictures.

Color picture data is made up of a luminance signal component Y and chorominance signal components Cr and Cb. Usually, more coded data are allocated to the luminance signal component Y than to the chrominance signal components Cr and Cb. The coded data outputs of the luminance signal component Y and chrominance signal components Cr and Cb each consist of coded data of DC components and coded data of AC components which have undergone orthogonal transform. The amount of AC coded data is determined by substracting the amount of DC coded data from the amount of coded data allocated to the associated component, i.e. Y or Cr and Cb.

Therefore, concerning the data of chrominance signal components Cr or Cb, for example, the allocation of coded data which is comparatively small in amount, it sometimes occurs that the amount of DC coded data of each of the components Cr and Cb exceeds the amount assigned thereto. Then, the amount of coded data of the DC components becomes short even if all the amount of coded data assigned to the component of interest are used. This prevents the DC coded data from being outputted and thereby practically disables the compressing coding device.

SUMMARY OF THE INVENTION

It is therefore an object of the present invention to provide a device for coding a picture signal by compression which allows coded data of DC components to be surely outputted.

In accordance with the present invention, in a device for coding a picture signal by compression which divides color picture data constituting a single picture into a plurality of blocks on each of a plurality of signal components which include a signal component containing a comparatively great amount of information and a signal component containing a comparatively small amount of information, and subjects the picture data to two-dimensional orthogonal transform block by block. A coded data distributing section for calculating an amount of coded data to be distributed block by block on the basis of a block-by-block activity of the picture data, a DC component coded data calculating section for calculating an amount of coded data of DC components coded, and an AC component coded data calculating section for calculating an amount of coded data of AC components to be coded on the basis of the amount of coded data of the DC components calculated by the DC component coded data calculating section are provided. The amount of coded data of the AC components to be coded is regulated by the amounts of data calculated by the coded data distributing section and AC component coded data calculating section.

BRIEF DESCRIPTION OF THE DRAWINGS

The objects and features of the present invention will become more apparent from the consideration of the following detailed description taken in conjunction with the accompanying drawings in which:

FIG. 10 is a flowchart representative of the operation of the embodiment shown in FIG. 2.

DESCRIPTION OF THE PREFERRED EMBODIMENTS

Figure 1:
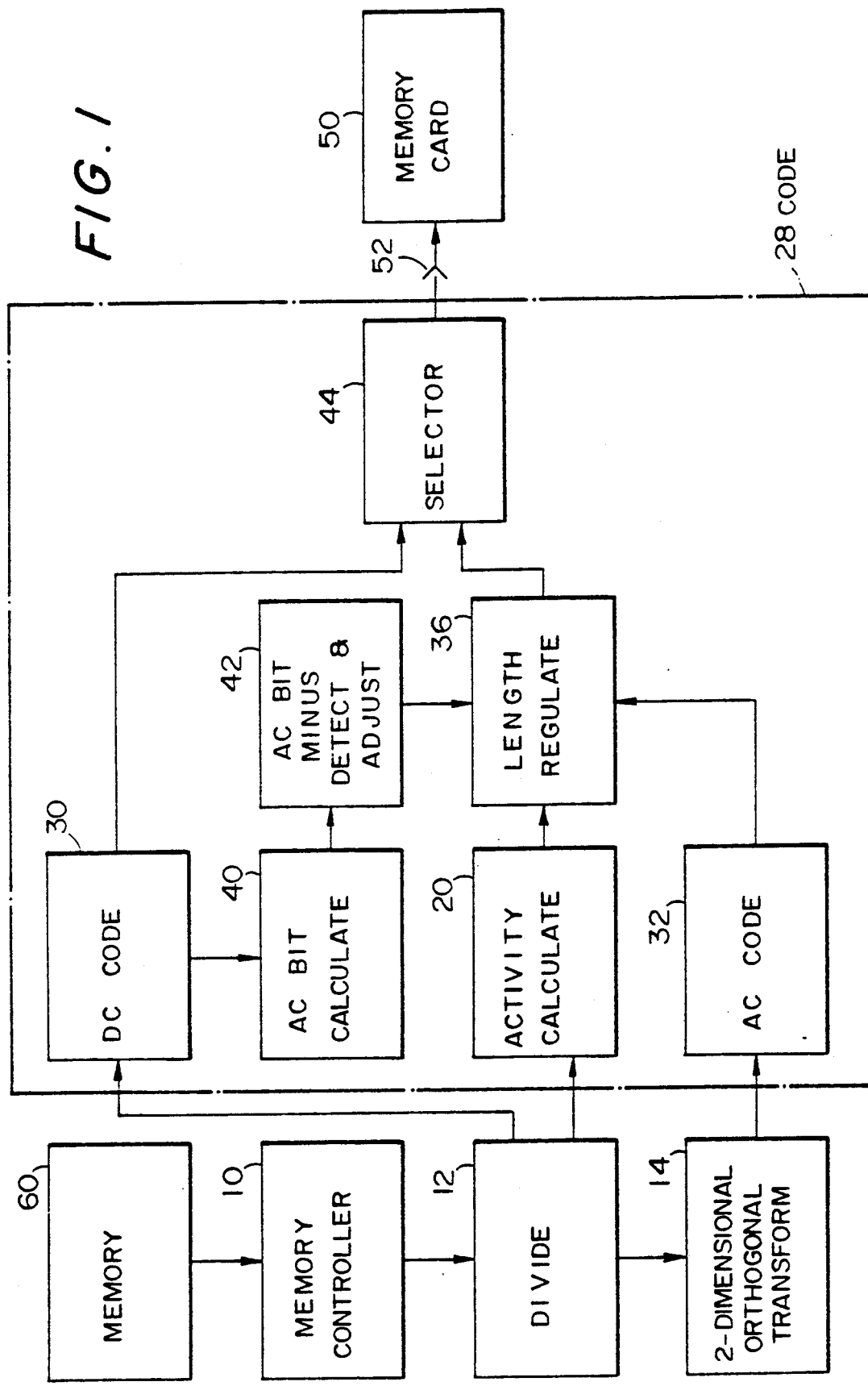
FIG. 1 is a block diagram schematically showing a picture signal compression coding device embodying the present invention.

Referring to FIG. 1 of the drawings, a compression coding device embodying the present invention is shown and includes a memory controller 10 and a video data memory 60 interconnected to the memory controller 10. The memory controller 10 reads one frame of still picture data picked up by an electronic still camera, for example, out of the memory 60. The picture data is made up of a luminance signal component Y and chrominance signal components Cr and Cb. The output of the memory controller 10 is fed to a dividing section 12 which is implemented by a frame buffer. The picture data fed to and stored in the dividing section 12 is divided into a plurality of blocks and read out thereof block by block. Each block of picture data is applied to a two-dimensional orthogonal transforming section 14. The orthogonal transforming section 14 transforms the picture data block by block by a discrete cosine transform, a Hadamard transform or 1 similar conventional two dimensional orthogonal transform.

Figure 7:
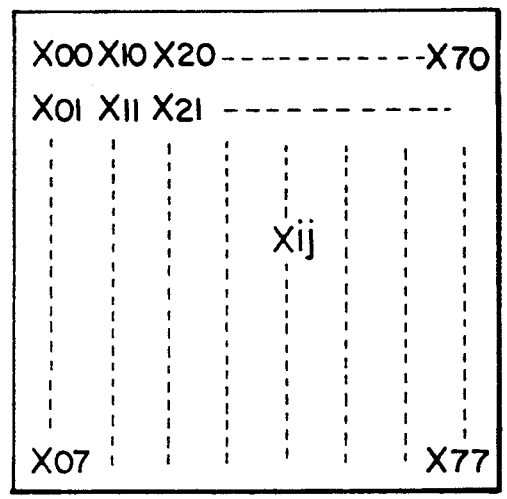
FIG. 7 depicts specific pixel data constituting a block.
Figure 8:
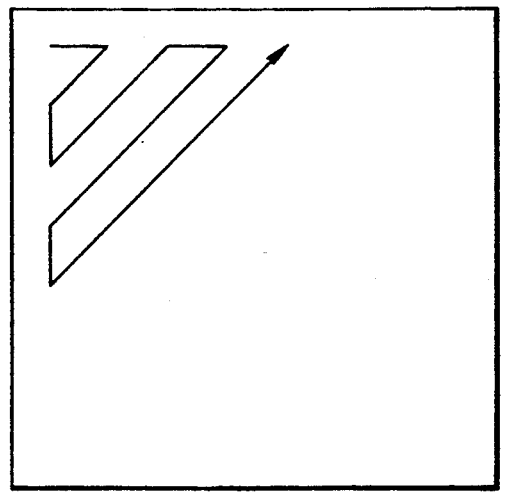
FIG. 8 indicates a sequence for coding the run-lengths of zeros and the amplitudes of non-zeros.

Each block of picture data having undergone two-dimensional orthogonal transform as stated above is arranged in rows and columns. The order of data sequentially increases from the top left to the bottom right. The output of the orthogonal transforming section 14 is normalized by a normalizing section, not shown, and then only the AC components of the normalized data are fed to an AC coding section 32 which is included in a coding section 28. The normalized transform coefficients are arranged in a block in the same manner as pixel data, as shown in FIG. 7. As FIG. 8 indicates, the AC components in the block are sequentially zig-zag scanned, the lowermost frequency component being first. The scanned AC components are sequentially applied to the AC coding section 32 of the coding section 28.

The AC coding section 32 codes the AC components of the normalized transform coefficients which are zig-zag scanned as stated above. Zero often appears in a string the AC components of the transform coefficients. Hence, the amount of continuous zeros, i.e., the run-length of zeros are detected to determine such run-length and the amplitude of non-zeros. The resulting run-length of zeros and the amplitide of non-zeros are coded by two-dimensional Huffman coding. The output of the AC coding section 32 is delivered to a length regulating section 36 which will be described.

The block-by-block picture data sequentially read out of the dividing section 12 are fed to an activity calculating section 20 also. The activity calculating section 20 determines the activities of the individual blocks, i.e., the degrees of the individual block to which picture data of high frequency components are predominant. Specifically, a block activity is determined by summing up the absolute values of the differences between the individual pixel data constituting a block and the mean value of all of such pixel data. Then, the activity calculating section 20 sums up the block-by-block activities to produce a total activity of the picture. Further, the activity calculating section 20 calculates, on the basis of the block-by-block activities of the picture and the total activity mentioned above, the number of bits which should be distributed to the coded data of the AC components of the transform coefficients constituting the individual blocks.

The number of coded bits which should be distributed to each block refers to a bit that a block of data having undergone two-dimensional Huffman coding and sequentially outputted from the low frequency component to the high frequency component should be ended, i.e., up to which bit the coded data should be outputted. The number of bits, bit-B, to be allocated to a block may be produced by:

bit-B = (act-b)/(act-t) × (total number of bits).

In the above equation, the term "total number of bits" is representative of the number of bits constituting the entire picture, i.e., the total number of bits to be assigned to the entire picture including a plurality of blocks at the time of coding. More specifically, when the block-by-block two-dimensional Huffmancoded data are sequentially fed out, the lowest frequency component being first, and each is ended at a given bit, the total number of bits mentioned above refers to the number of bits indicative of how many bits are allocated to the entire picture. This number of bits determines the amount of coded data of AC components which will be compressed and outputted.

In the equation shown above, "act-b" and "act-t" are representative of the activity of a block and the sum of such block-by-block activities, respectively. The above equation, therefore, means that the number of bits assigned to the entire picture is distributed to the individual blocks on the basis of the ratio of the block activity to the total activity. The output of the activity calculating section 20 is fed to the length regulating section 36.

DC components existing in the block-by-block picture data which have been read out of the dividing section 21 are applied to a DC coding section 30 which is also included in the coding section 28. The DC coding section 30 executes Huffman coding on the input picture data to produce DC coded data. The DC coded data are delivered from the DC coding section 30 to a selector 44.

Figure 3:
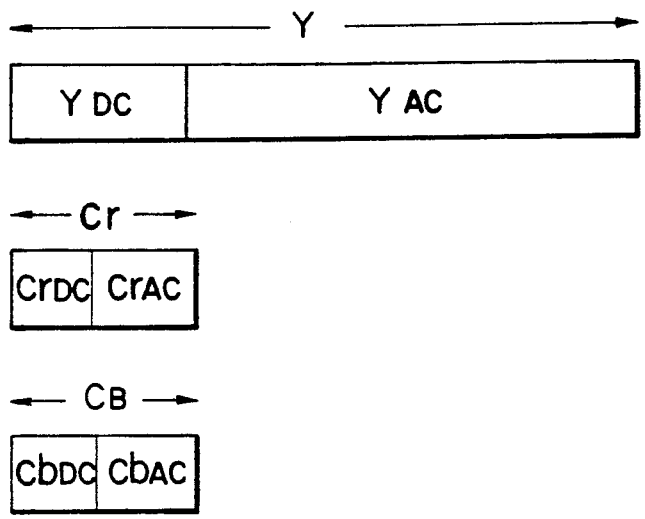
FIG. 3 shows the allocation of coded data in a usual condition.

Picture data is made up of a luminance signal Y and chrominance signals Cr and Cb, as stated earlier. As shown in FIG. 3, the total number of bits to be allocated to the coded data are allocated to the luminance signal Y and chrominance signals Cr and Cb in a predetermined ratio, e.g. Y:Cr:Cb=6:1:1. Specifically, in FIG. 3, Y, Cr and Cb are respectively indicative of the total number of bits allocated to the signals Y, Cr and Cb. In the signals Y, Cr and Cb, the number of bits YDC, CrDC of the coded data outputted by the DC coding section 30 are respectively subtracted from the total number of bits Y, Cr and Cb to produce the number of bits YAC, CrAC and CbAC which should be allocated to the AC coded data. Within the ranges of the individual AC coded data YAC, CrAC and CbAC allocated as stated above, the number of bits of AC coded data to be outputted is calculated block-by-block on the basis of the block activity, as stated previously.

Figure 4:
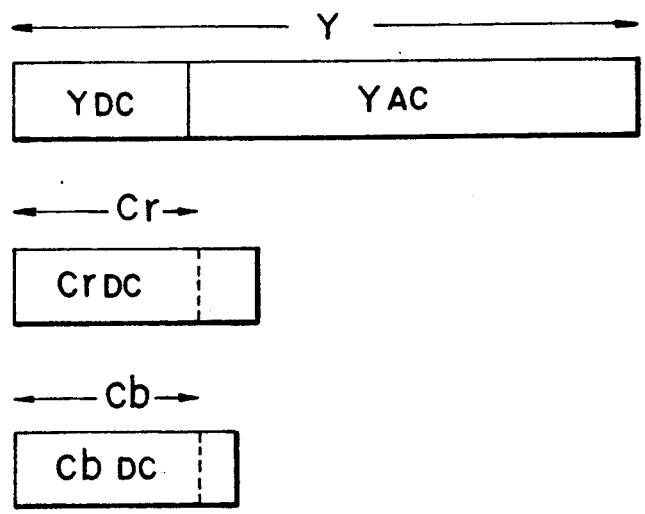
FIG. 4 indicates a specific condition wherein the amount of coded data is short.

The number of bits allocated to each of the chrominance signals Cr and Cb is comparatively small, as shown and described. Hence, it may occur that the DC coded data CrDC and CbDC produced by the DC coding section 30 are greater in the number of bits than the chrominance signals Cr and Cb, respectively, as shown in FIG. 4. Then, it will be impossible to send out the DC coded data CrDC and CbDC even if all the numbers of bits allocated to the chrominance signals Cr and Cb are used. The illustrative embodiment eliminates this problem by equalizing the numbers of bits Cr and Cb to be allocated to the chrominance signals Cr and Cb to the number of bits of the DC coded data CrDC and CbDC, respectively, and subtracting the shortage from the AC coded data of the luminance signal Y. This will be described more specifically later.

The number of bits YDC, CrDC and CbDC of the Huffmancoded DC data outputted by the DC coding section 30 are applied to an AC bit calculating section 40 also. The AC bit calculating section 40 subtracts the DC coded data of the luminance signal Y and chrominance signals Cr and Cb, i.e., the numbers of bits YDC, CrDC and CbDC from the total number of bits Y, Cr and Cb assigned to the associated components, thereby determining the number of bits YAC, CrAC and CbAC to be allocated to the individual AC components. The data in the form of YAC, CrAC and CbAC are delivered to an AC bit minus detecting and adjusting section 42.

Figure 5:
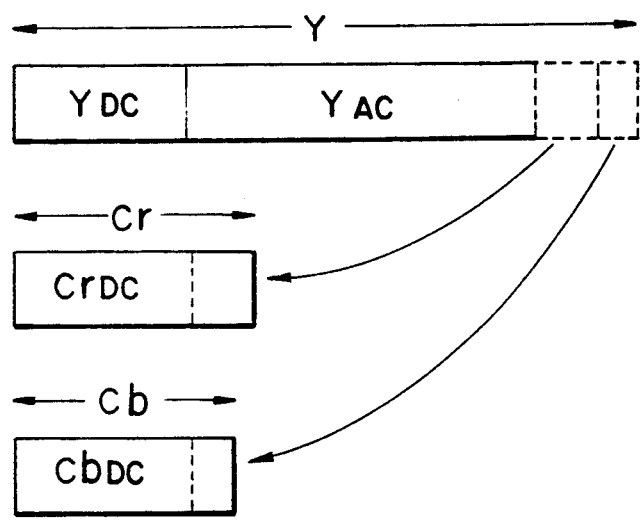
FIG. 5 depicts a specific procedure executed by the embodiment of FIG. 1 for changing the amount of coded data.

The AC bit minus detecting and adjusting section 42 determines whether or not any of the number of bits YAC, CrAC and CbAC allocated to the AC components of the respective signal components is negative. For example, assume that the numbers of bits CrDC and CbDC allocated to the DC coded data of the chrominance signals Cr and Cb exceed respectively the number of bits Cr and Cb allocated to the signals Cr and Cb and, therefore, the numbers of bits CrAC and CbAC allocated to the AC coded data both are negative, as depicted in FIG. 4. Then, as shown in FIG. 5 the AC bit minus detecting and adjusting section 42 adjusts the numbers of bits Cr and Cb to be allocated to these color components such that they become equal to the number of bits of the associated DC coded data CrDC and CbDC.

Further, the AC bit minus detecting and adjusting section 42 subtracts from the number of bits YAC allocated to the AC components of the luminance signal Y the shortage in the number of bits which is caused by the above-stated adjustment. It follows that, as shown in FIG. 5, the number of bits YAC allocated to the AC components of the luminance signal Y is reduced by the number of bits which are transferred to the chrominance signals Cr and Cb.

The operation stated above also occurs in the event when either one of the number of bits CrAC and CbAC allocated to the chrominance signals Cr and Cb are negative. Specifically, the AC bit minus detecting and adjusting section 42, reduces the number of bits to be allocated to the AC component, which are negative, to zero, corrects the number of bits Cr or Cb to be allocated to the chrominance signal of interest such that it becomes equal to the nubmer of bits CrDC or CbDC of the associated DC coded data, and subtracts the number of short bits from the number of bits YAC allocated to the AC component of the luminance signal Y.

The output of the AC bit minus detecting and adjusting section 42 is fed to the length regulating section 36. In response, the length regulating section 36 regulates the output such that the number of bits of the AC coded data fed from the AC coding section 32 does not exceed the number of coded bits bit-B of the block of interest which is fed thereto from the activity calculating section 20. Therefore, the AC coded data are delivered to the selector 44 within the range of the number of coded bits bit-B.

Also, the length regulating section 36 regulates the output such that the AC coded data of the respective components fed from the AC coding section 32 do not exceed the numbers of bits YAC, CrAC and CbAC of their associated components which are fed from the AC bit minus detecting and adjusting section 42. As a result, the amount of data YAC of coded output of the AC component included in the luminance signal Y is limited, as indicated in FIG. 5. Hence, even when the amounts of data CrDC and CbDC of the DC components of the chrominance signals Cr and Cb are increased beyond the amount of data Cr and Cb allocated to the associated components, the number of bits assigned to the entire image is prevented from becoming short.

If desired, the length regulating section 36 may be so constructed as to produce a difference between the number of coded bits bit-B to be allocated to a block and the number of bits of AC coded data actually fed to the selector 44, and deliver the difference to the activity calculating section 20 as carry-over bits. In such an alternative construction, the carry-over bits will be added to the coded bits bit-B to be allocated to a block.

The DC coded data from the DC coding section 30 and the AC coded data from the length regulating section 36 which have been limited in the number of bits are applied to the selector 44. The selector 44 sequentially selects and outputs the DC coded data and AC coded data. The output of the selector 44 is routed through a connector 52 to a memory card 50 to be written thereto. The memory card 50 is merely an example of a family of recording media and may be replaced with a magnetic disk or an optical disk, for example.

Reference will be made to the flowchart of FIG. 9 for describing the operation of the device having the construction shown in FIG. 1, particularly how the AC bit calculating section 40 and AC bit minus detecting and adjusting section 42 change the bit allocation as stated previously.

Figure 9:
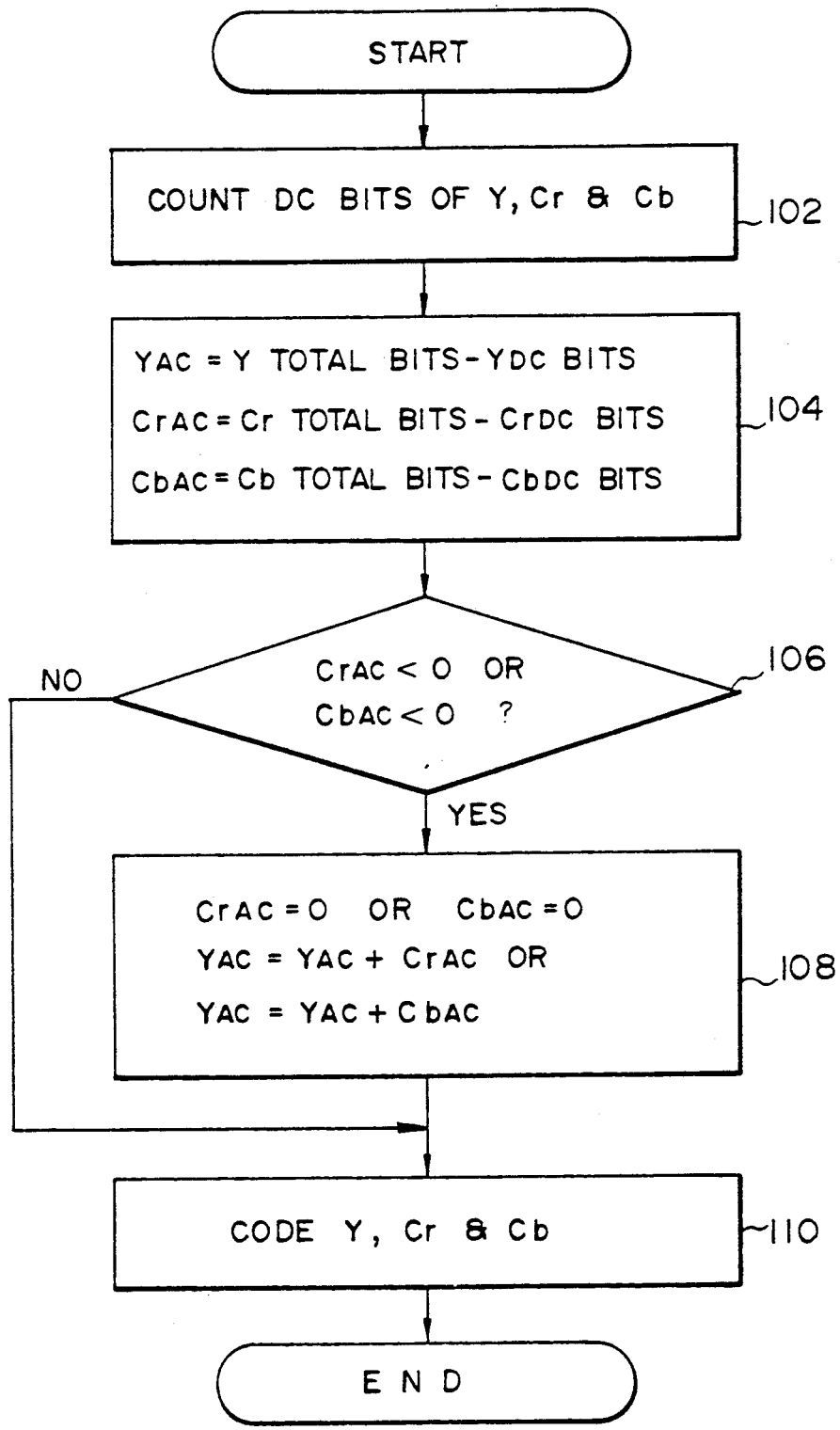
FIG. 9 is a flowchart demonstrating the operation of the embodiment shown in FIG. 1.

As shown in FIG. 9, when DC coded data is fed from the DC coding section 30 to the AC bit calculating section 40, the AC bit calculating section 40 counts the number of bits of the DC coded output data individually associated with the luminance signal Y and the chrominance signals Cr and Cb (step 102). Subsequently, the AC bit calculating section 40 subtracts the counted number of bits YDC, CrDC and CbDC of the DC coded output data from the total number of bits assigned to the associated luminance signal Y and chrominance signals Cr and Cb, thereby determining the numbers of bits YAC, CrAC and CbAC of the individual AC coded data which can be outputted (step 104). The resulting number of bits YAC, CrAC and CbAC are fed to the AC bit minus detecting and adjusting section 42.

In response, the AC bit minus detecting and adjusting section 42 determines whether or not one or both of the number of bits CrAC and CbAC of the AC coded data which can be outputted are negative (step 106). If one or both of the numbers of bits CrAC and CbAC are negative, the section 42 reduces CrAC, or CbAC, which is negative, to zero. More specifically, when the number of bits CrAC or CbAC of the AC coded data which can be outputted is negative, it is replaced with zero (step 108).

The AC bit minus detecting and adjusting section 42 adds the number of bits CrAC or CbAC which is minus as mentioned above to the number of bits YAC of AC coded data of the luminance signal Y which can be outputted (step 108). More specifically, the section 42 subtracts from the number of bits YAC of AC coded data of the luminance signal, which can be outputted, the shortage of coded data resulting from the fact that the number of bits CrDC or CbDC of DC coded data fed from the DC coding section 30 exceeds the allocated number of bits Cr or Cb. The section 42, therefore, successfully confines the output of coded data to the range of the total number of bits allocated to coded data.

As stated above, when color image data is to be coded, the illustrative embodiment assigns a particular amount of coded data to each of the luminance signal Y and chrominance signals Cr and Cb and thereby sets up an adequate allocation of coded data to the individual color components. Moreover, when the amount of DC coded data CrDC or CbDC of the chrominance signal Cr or Cb exceeds the assigned amount of data Cr or Cb of the component of interest, the amount of data Cr or Cb to be assigned to that component is equalized to the amount of data CrDC or CbDC. This allows all the DC coded data to be outputted even in such a condition, i.e., eliminates the occurrence that the function of the system of the compression coding device is interrupted because DC components cannot be coded.

The amount of short data, or shortage, resulting from the increase in the amount of data Cr or Cb to be assigned to the chrominance signal Cr or Cb as stated above is subtracted from the amount of AC coded data of the luminance signal Y. Hence, the amount of data to be assigned to the entire picture is maintained constant all the time. It is noteworthy that despite the resultant decrease in the amount of AC coded data YAC of the luminance signal Y, the quality of an image is little effected partly because a great amount of data is assigned to the luminance signal Y and partly because it is the AC components that is decreased in amount.

Figure 2:
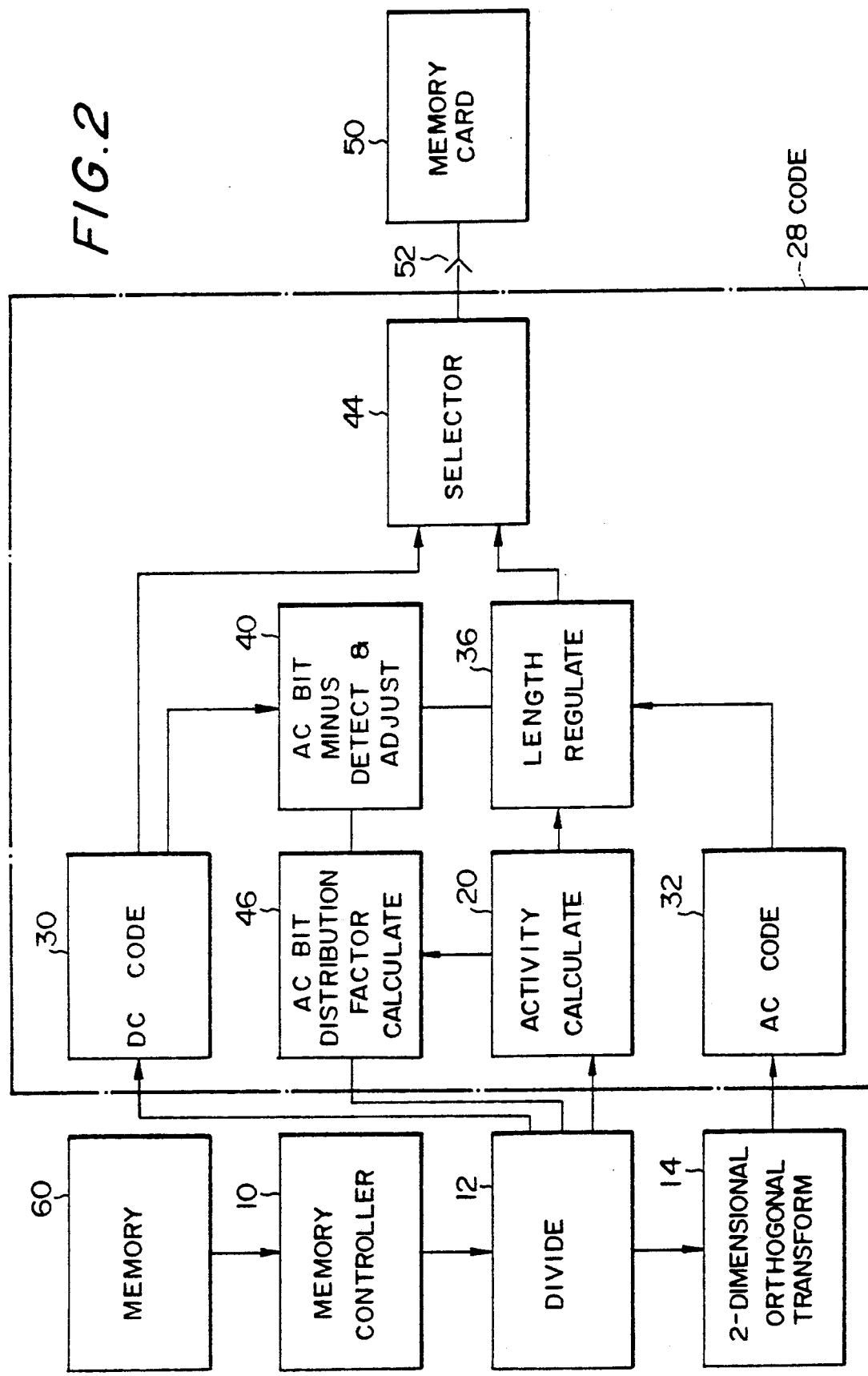
FIG. 2 is a block diagram schematically showing an alternative embodiment of the coding device in accordance with the present invention.
Figure 6:
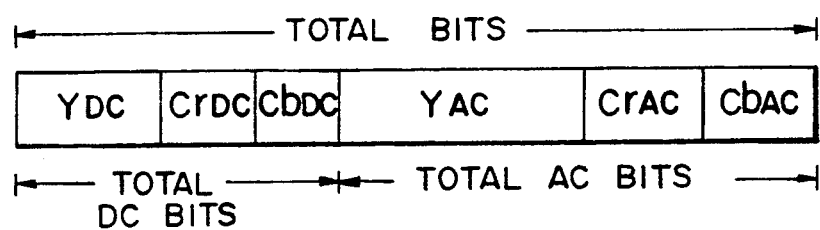
FIG. 6 shows an alternative scheme for allocating coded data.

Referring to FIG. 2, an alternative embodiment of the compression coding device in accordance with the present invention is shown. In the figures, the same or similar components are designated by like reference numerals, and a redundant description will be avoided for simplicity. As shown, the output of the DC coding section 30 is fed to the AC bit calculating section 40 as well as to the selector 44. Also fed to the AC bit calculating section 40 is the output data of an AC bit distribution factor calculating section 46. The AC bit distribution factor calculating section 46 calculates, in response to the picture data from the dividing section 12, ratios KY, KCr and KCb in which all the AC bits to be assigned to all the AC components and produced by subtracting all the DC bits of DC components from the total number of bits of coded data shown in FIG. 6 should be distributed to the AC components YAC, CrAC and CbAC of the individual color components. The ratios KY, KCr and KCb may be determined picture by picture or on the basis of the ratios of the sums of the Y, Cr and Cb activities. Further, the ratios KY, KCr and KCb may be fixed beforehand to, for example, KY:KCr:KCb=6:1:1.

By using the ratios KY, KCr and KCb fed from the AC bit distribution factor calculating section 46, the AC bit calculating section 40 calculates the numbers of bits YAC, CrAC and CbAC which should be allocated to the AC components of the individual color components. The output of the AC bit calculating section 40 is applied to the length regulating section 36.

The rest of the construction and operation of the embodiment shown in FIG. 2 is essentially the same as the embodiment of FIG. 1 and will not be described to avoid redundancy.

A reference will be made to FIG. 10 for describing the operation of the embodiment shown in FIG. 2, particularly how the number of bits YAC, CrAC and CbAC meant for the AC components are distributed. As shown, when DC coded data is fed from the DC coding section 30 to the AC bit calculating section 40, the calculating section 40 counts the bits of the individual DC components YDC, CrDC and CbDC each being associated with a different color component (step 122). On the other hand, the AC bit distribution factor calculating section 46 calculates, in response to image data fed from the dividing section 12, the ratios KY, KCr and KCb in which all the AC bits should be distributed to the AC components YAC, CrAC and CbAC of the individual color components (step 124). Alternatively, the calculating section 46 may determine such ratios KY, KCr and KCb by using the output of the activity calculating section 20. Based on the counted numbers of bits YCD, CrDC and CbDC of the DC components and the ratios KY, KCr and KCb, the AC bit calculating section 40 calculates the number of bits YAC, CrAC and CbAC to be allocated to the AC components of the individual color components, as follows:

$$YAC = (\text{total number of bits} - \text{all DC bits}) \times KY$$

$$CrAC = (\text{total number of bits} - \text{all DC bits}) \times KCr$$

$$CbAC = (\text{total number of bits} - \text{all DC bits}) \times KCb.$$

$$KY + KCr + KCb = 1$$

As the above equations indicate, the number of bits YAC, CrAC and CbAC to be allocated to the AC components of the individual color components are produced by summing up the number of bits of the DC components YDC, CrDC and CbDC and thereby determines the total number of DC bits by substracting the total number of DC bits from the total number of bits as shown in FIG. 5, and then multiplying the resulting difference by the ratios KY, KCr and KCb.

The number of bits YAC, CrAC and CbAC to be allocated to the AC components as produced by the AC bit calculating section 40 are delivered to the length regulating section 36. As a result, the AC coded data to be outputted by the length regulating section 36 each are limited to the range YAC, CrAC or CbAC.

The activity calculating section 20, as in the embodiment of FIG. 1, calculates a block-by-block activity with each of YAC, CrAC and CbAC and thereby determines the amount of coded data block-by-block (step 128). The coded output from the length regulating section 36 is fed to the selector 44 while being regulated by the block-by-block amounts of coded data and the number of bits to be allocated to YAC, CrAC and CbAC fed from the AC bit calculating section 40.

The rest of the operation is the same as in the embodiment of FIG. 1 and, therefore, will not be described to avoid redundancy.

Advantages attainable with the construction shown in FIG. 2 are as follows. Because DC coded data are subtracted from the total number of bits and the remainder is allocated to AC coded data, a sufficient number of bits are available for DC coded data at all times and, therefore, DC coded data are fully outputted. This frees the system operations from interruptions. Concerning the AC coded data, the number of bits produced by substracting the total number of DC bits from the total number of bits is allocated to the individual color components in a predetermined ratio. This is successful in setting up an adequate ratio of the number of bits of the individual color components.

In the embodiments shown and described, the number of bits of AC coded output is distributed to the individual blocks commensulately with the block-byblock activity. This allows an effective amount of AC coded data to be outputted block-by-block on the basis of the block-by-block activity. Specifically, a great number of bits are allocated to a block in which high frequency components are predominant, because the activity of such a block is high; and a small number of bits allocated to a block in which low frequency components are predominant, because the activity of such a block is low. In this manner, a particular amount of AC coded data is outputted in matching relation to the block.

In summary, it will be seen that the present invention provides a picture signal compression coding device which calculates the amount of coded data of AC components by taking account of the amount of coded data of DC components. The device is, therefore, capable of coding a picture smoothly while allocating a sufficient amount of data to the coded data of DC components at all times. Further, because the amount of data of coded output of each block is limited on the basis of the activity of the block, each block is outputted in an amount of an amount of data matching the frequency components existing therein.

While the present invention has been described with reference to the particular illustrative embodiments, it is not to be restricted by the embodiments, but only by the appended claims. It is to be appreciated that those skilled in the art can change or modify the embodiments without departing from the scope and spirit of the present invention.

What is claimed is:

1. A device for coding a picture signal by compression which divides digital color picture data including a single picture into a plurality of blocks on each of a plurality of signal components which include a first signal component containing a comparatively great amount of information and a second signal component containing a comparatively small amount of information, and subjects said picture data to two-dimensional orthogonal transform block-by-block, said device comprising:
   coded data distributing means for calculating an amount of coded data to be distributed block-by-block on the basis of a block-by-block activity of the picture data;
   DC component coded data calculating means for calculating an amount of coded data of DC components coded; and
   AC component coded data calculating means for calculating an amount of coded data of AC components to be coded on the basis of the amount of coded data of the DC components calculated by said DC component coded data calculating means on a signal component basis by subtracting the amount of coded data of the DC components calculated by said DC component coded data calculating means from a total amount of data assigned to each of said signal components, when the amount of coded data of the AC components of the second signal component whose amount of information is comparatively small is a negative amount, the amount of coded data of the AC components of said signal component to zero and subtracting a shortage of said amount of coded data which is a negative amount from the amount of coded data of AC components of the signal component whose amount of information is comparatively great;
   the amount of coded data of the AC components to be coded being regulated by the amount of data calculated by said coded data distributing means and said AC component coded data calculating means.

2. A device in accordance with claim 1, wherein the first signal component whose amount of data is comparatively great comprises a luminance signal component, and the second signal component whose amount of data is comparatively small comprises first and second chrominance signal components.

3. A device for coding a picture signal by compression which divides digital color picture data including a single picture into a plurality of blocks on each of a plurality of signal components which include a first signal component containing a comparatively great amount of information and a second signal component containing a comparatively small amount of information, and subjects said picture data to two-dimensional orthogonal transform block-by-block, said device comprising:
   coded data distributing means for calculating an amount of coded data to be distributed block-by-block on the basis of a block-by-block activity of the picture data;
   DC component coded data calculating means for calculating an amount of coded data of DC components coded; and
   AC component coded data calculating means for calculating an amount of coded data of AC components to be coded on the basis of the amount of coded data of the DC components calculated by said DC component coded data calculating means and a total amount of data of the amount of coded data of DC components, the amount of coded data of AC components calculated on a signal component basis by multiplying the total amount of the amount of coded data of AC components by a predetermined distribution ratio and the total amount of data of the amount of coded data of DC components calculated by subtracting a sum of the amounts of coded data of AC components calculated by said DC component coded data calculating means from a total amount of data assigned for coding the color picture;
   the amount of coded data of the AC components to be coded being regulated by the amount of data calculated by said coded data distributing means and said AC component coded data calculating means.

4. A device in accordance with claim 3, wherein the signal components comprise a luminance signal component Y and chrominance signal components Cr and Cb, said predetermined distribution ratio is Y:Cr:Cb=6:1:1.

5. A method for coding a picture signal by compression, comprising the steps of:
   (a) dividing digital color picture data including a single picture into a plurality of blocks on each of a plurality of signal components which include a first signal component containing a comparatively great amount of information and a second signal component containing a comparatively small amount of information;
   (b) subjecting said picture data to two-dimensional orthogonal transform block-by-block;
   (c) calculating an amount of coded data to be distributed block-by-block on the basis of a block-by-block activity of the picture data;

(d) calculating an amount of coded data of DC components coded;

(e) calculating an amount of coded data of AC components to be coded on the basis of the amount of coded data of the DC components calculated at said step (d) on a signal component basis by subtracting the amount of coded data of the DC components calculated at said step (d) from a total amount of data assigned to each of said signal components, reducing, when the amount of coded data of the AC components of the second signal component whose amount of information is comparatively small is a negative amount, the amount of coded data of the AC components of said signal component to zero and subtracting a shortage of said amount of coded data which is a negative amount from the amount of coded data of AC components of the first signal component whose amount of information is comparatively great; and (f) regulating the amount of coded data of the AC components to be coded by the amount of data calculated at said steps (c) and (e).

6. A method in accordance with claim 5, wherein the first signal component whose amount of data is comparatively great comprises a luminance signal component, and the second signal component whose amount of data is comparatively small comprises first and second chrominance signal components.

7. A method for coding a picture signal by compression, comprising the steps of:

(a) dividing digital color picture data including a single picture into a plurality of blocks on each of a plurality of signal components which include a first signal component containing a comparatively great amount of information and a second signal component containing a comparatively small amount of information;

(b) subjecting said picture data to two-dimensional orthogonal transform block-by-block;

(c) calculating an amount of coded data to be distributed block-by-block on the basis of a block-by-block activity of the picture data;

(d) calculating an amount of coded data of DC components coded;

(e) calculating an amount of coded data of AC components to be coded on the basis of the amount of coded data of the DC components calculated at said step (d) and a total amount of data of the amount of coded data of DC components, the amount of coded data of AC components calculated on a signal component basis by multiplying the total amount of the amount of coded data of AC components by a predetermined distribution ratio and the total amount of data of the amount of coded data of DC components calculated by subtracting a sum of the amounts of coded data of AC components calculated at said step (d) from a total amount of data assigned for coding the color picture; and (f) regulating the amount of coded data of the AC components to be coded by the amount of data calculated at said steps (c) and (e).

8. A method in accordance with claim 7, wherein the signal components comprise a luminance signal component Y and chrominance signal components Cr and Cb, said predetermined distribution ratio is Y:Cr:Cb=6:1:1.

* * * * *